(No Model.)

A. A. HAWES.
TOOL FOR SETTING PLANTS.

No. 486,713. Patented Nov. 22, 1892.

Witnesses,
Brayton S. Ives,
Edward W. Bush

Inventor,
Alonzo A. Hawes
By James Shepard.
Atty.

UNITED STATES PATENT OFFICE.

ALONZO A. HAWES, OF WALLINGFORD, CONNECTICUT.

TOOL FOR SETTING PLANTS.

SPECIFICATION forming part of Letters Patent No. 486,713, dated November 22, 1892.

Application filed July 30, 1892. Serial No. 441,732. (No model.)

*To all whom it may concern:*

Be it known that I, ALONZO A. HAWES, a citizen of the United States, residing at Wallingford, in the county of New Haven and State of Connecticut, have invented certain new and useful Improvements in Tools for Setting Plants, of which the following is a specification.

My invention relates to improvements in tools for setting plants; and the chief object of my improvement is to provide a convenient tool for rapidly making proper holes for setting plants.

Figure 1:
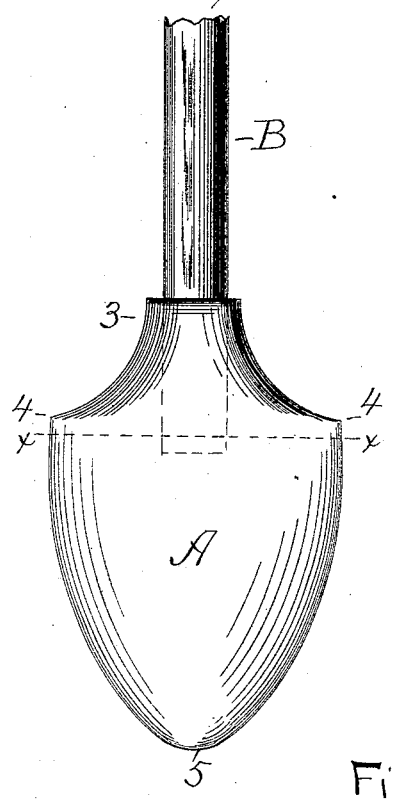
Figure 2:
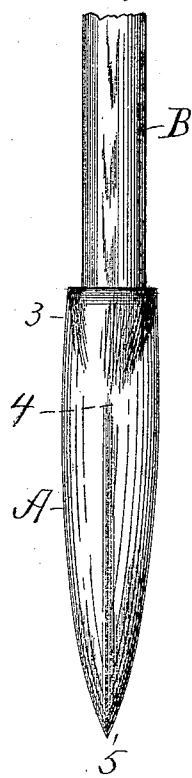
Figure 3:
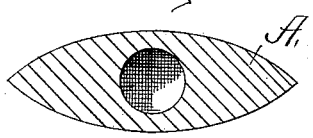

In the accompanying drawings, Figure 1 is a side elevation of my implement with the upper end of the handle broken off. Fig. 2 is an edge view of the same, and Fig. 3 is a horizontal section on the line $x\ x$ of Fig. 1.

A designates the blade, and B the handle. The upper end of the blade is in the form of a rounded neck 3 within which is a suitable socket to receive the lower end of the handle B, as indicated by broken lines in Fig. 1. The upper end of the neck is preferably round in plan view, and it is slightly thickened as it extends downwardly on the two sides which meet the two broad sides of the blade A and widened laterally as it extends downwardly to meet the upper corners 4 of the blade. The portion of the blade which is below the corners 4 does the principal work. In side view the blade extends from said corners in convex lines to the middle point 5 at its extreme lower end in substantially the form of a rounded dart, the sides being brought to an edge substantially from one corner 4 downward and upward to the opposite corner, although I make said edge somewhat sharper at the lower part of the implement. In edge view the blade curves gradually from the neck to the sharper lower edge at the point 5, as best shown in Fig. 2. In cross-section the blade is in the form of an ellipse, as shown in Fig. 3. The handle will of course be made of wood or some light material, while the blade will be made of a harder and heavier substance—as, for example, cast-iron. While the blade should have the general form described, it may be made in large and small sizes for setting different kinds of plants. The blade shown in the drawings is particularly adapted for making holes for setting strawberry-plants. It is also evident that the blade should be ground or polished so as to have a smooth surface in order to best do its work.

In use the ground is marked in rows either with or without cross-marking. The operator takes hold of the handle, which is long enough to enable him to stand erect, and walks along, lifting the blade by the handle and then dropping it forcibly at the points where the plants are to be set. In some cases he may also work the implement sidewise when in the ground; but this will not generally be necessary. In this way he can make proper holes for setting strawberry or other plants while he is walking over the ground, and thereby one man can make holes enough to keep several hands at work setting the plants.

I claim as my invention—

The herein-described implement, consisting of the handle and blade, the latter being in substantially the form of a rounded dart in side view and elliptical in cross-section with a thickened middle portion, substantially as described, and for the purpose specified.

ALONZO A. HAWES.

Witnesses:
O. J. MARTIN,
O. H. D. FOWLER.